(12) United States Patent
Okada et al.

(10) Patent No.: US 8,202,600 B2
(45) Date of Patent: Jun. 19, 2012

(54) ARTIFICIAL LEATHER, BASE TO BE USED IN THE LEATHER, AND PROCESSES FOR PRODUCTION OF BOTH

(75) Inventors: Hozuma Okada, Kyoto (JP); Kunio Ichihashi, Osaka (JP)

(73) Assignee: Tradik Co., Ltd., Kyoto (JP)

( * ) Notice: Subject to any disclaimer, the term of this patent is extended or adjusted under 35 U.S.C. 154(b) by 615 days.

(21) Appl. No.: 12/309,618

(22) PCT Filed: Jul. 25, 2007

(86) PCT No.: PCT/JP2007/064602
§ 371 (c)(1),
(2), (4) Date: Mar. 4, 2009

(87) PCT Pub. No.: WO2008/013206
PCT Pub. Date: Jan. 31, 2008

(65) Prior Publication Data
US 2009/0291250 A1 Nov. 26, 2009

(30) Foreign Application Priority Data
Jul. 27, 2006 (JP) .................................. 2006-204930

(51) Int. Cl.
*B23B 5/26* (2006.01)
*D06N 3/00* (2006.01)
*D04H 1/492* (2012.01)

(52) U.S. Cl. .......... 428/91; 442/387; 442/381; 442/105; 428/904; 28/103; 28/104; 427/389.9; 427/394

(58) Field of Classification Search .............. 428/91, 428/904; 442/381, 387, 388, 389, 392, 105, 442/164; 28/107; 427/389.9, 394
See application file for complete search history.

(56) References Cited

U.S. PATENT DOCUMENTS

| 4,147,574 A | 4/1979 | Setsuie et al. |
| 4,426,421 A | 1/1984 | Nakamae et al. |
| RE31,601 E * | 6/1984 | Ikeda et al. ..................... 428/93 |

(Continued)

FOREIGN PATENT DOCUMENTS

EP 1867779 A1 * 12/2007

(Continued)

*Primary Examiner* — Cheryl Juska
(74) *Attorney, Agent, or Firm* — Hamre, Schumann, Mueller & Larson, P.C.

(57) ABSTRACT

A sheet of an artificial leather substrate contains an upper-layer nonwoven fabric A (1) and a base nonwoven fabric B (2). The upper-layer nonwoven fabric A (1) is a wet-laid nonwoven fabric having a density of 0.30 to 0.50 g/cm³ and being produced with synthetic fibers in which the component fibers have a fineness of 0.005 to 1.1 dtex, a fiber length of 3 to 10 mm and a weight per unit area of 20 to 150 g/m², and the base nonwoven fabric B (2) is a layer of a nonwoven fabric having a density of 0.15 g/cm³ or more and less than 0.28 g/cm³ and being produced with synthetic fibers in which the component fibers have a fineness greater than that of the component fibers of the upper-layer nonwoven fabric A and 4.5 dtex or less, a fiber length of 2 to 15 mm and a weight per unit area of 50 to 400 g/m². The upper-layer nonwoven fabric A (1) and the base nonwoven fabric B (2) are layered, made into a single body by entanglement of the component fibers of both layers and impregnated with an elastic polymer. Thus, artificial leather having a texture similar to natural leather and a substrate for use therein are provided at low cost.

20 Claims, 2 Drawing Sheets

U.S. PATENT DOCUMENTS

| | | | |
|---|---|---|---|
| 5,298,315 A * | 3/1994 | Fukui et al. | 442/387 |
| 6,451,404 B1 * | 9/2002 | Nobuto et al. | 428/91 |
| 7,091,139 B2 * | 8/2006 | Nobuto et al. | 442/136 |
| 7,820,568 B2 * | 10/2010 | Horiguchi et al. | 442/268 |
| 7,998,887 B2 * | 8/2011 | Horiguchi et al. | 442/333 |
| 2001/0024709 A1 * | 9/2001 | Yoneda et al. | 428/91 |
| 2003/0022575 A1 | 1/2003 | Yoneda et al. | |
| 2004/0063366 A1 * | 4/2004 | Nakayama et al. | 442/104 |
| 2005/0118394 A1 * | 6/2005 | Tanaka et al. | 428/151 |

FOREIGN PATENT DOCUMENTS

| | | |
|---|---|---|
| JP | 54-27065 | 3/1979 |
| JP | 54-52703 | 4/1979 |
| JP | 54-125771 | 9/1979 |
| JP | 55-93881 | 7/1980 |
| JP | 3-16425 | 3/1991 |
| JP | 6-65848 | 3/1994 |
| JP | 6-280145 | 10/1994 |
| JP | 11-269774 | 10/1999 |
| JP | 2000-54250 | 2/2000 |
| JP | 2001131878 A * | 5/2001 |
| JP | 2002-30578 | 1/2002 |
| JP | 2003-13369 | 1/2003 |
| JP | 2004-332173 | 11/2004 |
| JP | 2004339617 A * | 12/2004 |
| JP | 2005-330595 | 12/2005 |
| JP | 2006-152461 | 6/2006 |
| WO | WO 2006085522 A1 * | 8/2006 |

* cited by examiner

ARTIFICIAL LEATHER, BASE TO BE USED IN THE LEATHER, AND PROCESSES FOR PRODUCTION OF BOTH

TECHNICAL FIELD

The present invention relates to artificial leather and a substrate for use in the artificial leather, and is suitably applicable as full-grain leather for bags, shoes, etc., or suede leather for clothing, seats, automobile seats, etc.

BACKGROUND ART

To attain a natural leather-like texture in artificial leather, Patent Document 1 discloses a method in which a knitted/woven fabric is disposed between a screened sheet composed of ultrafine fibers having 0.5 dtex or less and another screened fibrous sheet, the layered sheets are subjected to hydroentanglement, and the thus laminated and entangled material is then filled with an elastic polymer such as polyurethane to give artificial leather having an apparent density of 0.15 g/cm$^3$ or more on the front surface side and an apparent density of less than 0.15 g/cm$^3$ on the back surface side. Moreover, Patent Document 2 discloses a sheet that is made of a nonwoven fabric and a polyurethane binder and has a density gradient in a thickness direction. Furthermore, Patent Documents 3 and 4 disclose a substrate for use in synthetic full-grain leather in which the fineness of the upper layer of the artificial leather substrate is less fine than that of the lower layer. Since the density of a group of fibers in the lower layer is excessively low, the artificial leather of Patent Document 1 does not exhibit a sufficiently rich feel, tautness or resilience, and is not suitable as full-grain leather. In addition, for suede use, this artificial leather has a texture far different from that of natural leather. In Patent Document 2, in the processes after producing a nonwoven fabric, hot pressing and then impregnation with two types of polyurethane are performed to create a density gradient. This method, however, involves a troublesome procedure such as hot pressing, and unlike the natural leather structure having a fineness gradient, qualities such as tautness and resilience that are characteristics of natural leather are not attained. In connection with Patent Documents 3 and 4, two lines of an opening device and a carding machine as well as a plant site covering a large area are necessary to form the substrate having two layers of different line densities. In addition, the barb depth of needles is limited to prevent the fibers on the reverse side from appearing on the front surface, and thus the extent of entanglement is low. Therefore, to provide the strength required for commercialization, the number of times the entanglement is performed, i.e., the number of needles or the number of times the web is required to pass through the line has to be much greater than in a standard method. Thereby the production method is neither reasonable nor economical.

Patent Document 1: JP 55 (1980)-93881 A
Patent Document 2: JP 6 (1994)-280145 A
Patent Document 3: JP 11 (1999)-269774 A
Patent Document 4: JP 2003-13369 A

DISCLOSURE OF INVENTION

The present invention provides artificial leather having a texture that is quite similar to the texture of natural leather and also provides a substrate for use in the artificial leather at low cost.

The artificial leather substrate of the present invention is a sheet of artificial leather substrate containing an upper-layer nonwoven fabric A and a base nonwoven fabric B. The upper-layer nonwoven fabric A is a wet-laid nonwoven fabric that has a density of 0.30 to 0.50 g/cm$^3$ and that is produced with synthetic fibers in which the component fibers have a fineness of 0.005 to 1.1 dtex, a fiber length of 3 to 10 mm and a weight per unit area of 20 to 150 g/m$^2$. The base nonwoven fabric B is a layer of a nonwoven fabric that has a density of 0.15 g/cm$^3$ or more and less than 0.28 g/cm$^3$ and that is produced with synthetic fibers in which the component fibers have a fineness less fine than that of the component fibers of the upper-layer nonwoven fabric A and 4.5 dtex or less, a fiber length of 2 to 60 mm and a weight per unit area of 50 to 400 g/m$^2$. The upper-layer nonwoven fabric A and the base nonwoven fabric B are layered, made into a single body by entanglement of the component fibers of both layers, and impregnated with an elastic polymer.

The method for producing an artificial leather substrate of the present invention is a method for producing a sheet of an artificial leather substrate containing an upper-layer nonwoven fabric A and a base nonwoven fabric B. The upper-layer nonwoven fabric A is a wet-laid nonwoven fabric that has a density of 0.30 to 0.50 g/cm$^3$ and that is produced with synthetic fibers in which the component fibers have a fineness of 0.005 to 1.1 dtex, a fiber length of 3 to 10 mm and a weight per unit area of 20 to 150 g/m$^2$. The base nonwoven fabric B is a layer of a nonwoven fabric that has a density of 0.15 g/cm$^3$ or more and less than 0.28 g/cm$^3$ and that is produced with synthetic fibers in which the component fibers have a fineness less fine than that of the component fibers of the upper-layer nonwoven fabric A and 4.5 dtex or less, a fiber length of 2 to 60 mm and a weight per unit area of 50 to 400 g/m$^2$. The upper-layer nonwoven fabric A and the base nonwoven fabric B are layered, injected with pressurized water in thickness directions to make the upper-layer nonwoven fabric A and the base nonwoven fabric B into a single body by entanglement of the component fibers of both layers, and impregnated with an elastic polymer.

In the artificial leather of the present invention, the surface of the upper-layer nonwoven fabric A of the artificial leather substrate is napped.

In the artificial leather of another embodiment of the present invention, a resin containing polyurethane as the main ingredient is applied to or a film thereof is attached to the upper-layer nonwoven fabric A of the artificial leather substrate.

DESCRIPTION OF THE INVENTION

According to the present invention, artificial leather having properties very similar to those of natural leather can be obtained at low cost. This is because the artificial leather substrate of the present invention has a structure similar to that of natural leather, i.e., a structure having a fineness gradient in a cross-sectional direction such that the fineness of the surface layer is high and the fineness of the back surface side is low as well as a density gradient such that the density of the surface layer is high and the density of the back surface side is low.

In natural leather, the number of collagenous fibers that constitutes one fiber bundle is increased and fiber bundles are thicker in deeper portions toward subcutaneous tissues from the papillary layer while the density is lower in deeper portions. In addition to such a fineness gradient and density gradient, a fiber bundle layer in which the fiber bundles as a whole are oriented parallel to the surface, compared to the fiber bundles in the upper and lower layers, is present in the middle of the dermis. This layered structure seems to give the textures properties such as tautness and resilience.

The present inventors conceived of the present invention based on such an analysis, and since the substrate of the present invention is, as described above, structurally similar to natural leather, it has physical properties similar to those of natural leather.

The artificial leather substrate of the present invention contains at least the upper-layer nonwoven fabric A and the base nonwoven fabric B, and is obtained by layering the upper-layer nonwoven fabric A and the base nonwoven fabric B, making the fabrics into a single body by entangling the component fibers of both layers, and impregnating the resulting material with an elastic polymer. A nonwoven fabric produced with synthetic fibers is used as the upper-layer nonwoven fabric A, and a dry-laid web layer produced with synthetic fibers is used as the base nonwoven fabric B. That is, the upper-layer nonwoven fabric A contains a wet-laid nonwoven fabric that has a density of 0.30 to 0.50 g/cm$^3$ and that is produced with synthetic fibers in which the component fibers have a fineness of 0.005 to 1.1 dtex, a fiber length of 3 to 10 mm and a weight per unit area of 20 to 150 g/m$^2$, and the base nonwoven fabric B is a dry-laid web layer that has a density of 0.15 g/cm$^3$ or more and less than 0.28 g/cm$^3$ and that is produced with synthetic fibers in which the component fibers have a fineness less fine than that of the component fibers of the upper-layer nonwoven fabric A and 4.5 dtex or less, a fiber length of 2 to 60 mm and a weight per unit area of 50 to 400 g/m$^2$. The upper-layer nonwoven fabric A and the base nonwoven fabric B are entangled and made into a single body by injecting pressurized water in thickness directions of the sheet.

According to the present invention, the fibers of the upper-layer nonwoven fabric A (hereinafter sometimes referred to as the "upper layer") and the fibers of the base nonwoven fabric B (hereinafter sometimes referred to as the "lower layer") are entangled during hydroentanglement, thereby uniting the upper layer and the lower layer. Since a water-soluble polymer is filled into the lower layer to a density higher than that in the upper layer, the upper layer after hydroentanglement is impregnated with larger amounts of elastic polymer solution than the lower layer. The water-soluble polymer then is removed by elution by hot-water washing, dyeing, etc. The elastic polymer and the fibers in both layers remain non-bonded due to the presence of the water-soluble polymer that is filled prior to the elastic polymer. As a result, softness is attained and the upper layer is relatively denser than the lower layer, thereby giving the aforementioned artificial leather substrate.

The fineness of the constituent fibers of the upper layer A in the range of 0.005 to 1.1 dtex results in good surface smoothness. A fineness preferable in high-quality suede applications or grain-finished applications is 0.3 dtex or less. In particular, a wet-laid nonwoven fabric produced with directly-spun polyethylene terephthalate fibers having about 0.1 to 0.3 dtex is preferable for the surface layer. The fiber length of the wet-laid nonwoven fabric is 3 to 10 mm, and more preferably 3 to 6 mm. A fiber length within an aforementioned range allows the wet-laid nonwoven fabric to be produced efficiently and gives good surface smoothness. The weight per unit area of the wet-laid nonwoven fabric is 20 to 150 g/m$^2$, and more preferably 30 to 100 g/m$^2$. A weight per unit area within this range allows the upper layer to appear similar to the epidermal layer of natural leather. The density of the wet-laid nonwoven fabric is in a range of 0.30 to 0.50 g/cm$^3$, and more preferably 0.40 to 0.50 g/m$^3$. A density within this range allows the upper layer to appear similar to the epidermal layer of natural leather.

The base nonwoven fabric B has a fineness less fine than that of the aforementioned upper layer A and 4.5 dtex or less, and more preferably 1.1 to 3.3 dtex. A fineness within this range results in a material quite similar to natural leather, giving good dimensional stability and strength retention. The fiber length of the base nonwoven fabric B is preferably 2 to 60 mm, and more preferably 3 to 50 mm. A fiber length within an aforementioned range allows a wet-laid nonwoven fabric or an air-laid layer to be produced efficiently. The weight per unit area of the base nonwoven fabric B is 50 to 400 g/m$^2$, and the density thereof is 0.15 g/cm$^3$ or more and less than 0.28 g/cm$^3$. A weight per unit area and a density within these ranges result in a material quite similar to natural leather, giving good dimensional stability and strength retention.

In the present invention, a card web layer or an air-laid web layer may be used as the synthetic fiber dry web layer B. A card web layer can be obtained by a method in which a web is formed by combing short fibers in a specific direction using a carding machine equipped with a rotatable cylinder having fine-mesh wires (card clothing). This is a method used in short-fiber spinning. An air-laid web layer can be obtained by a method in which short fibers are dispersed in air and collected on a screen to form a web.

The card web layer is preferably a web layer having a fineness of 1.0 to 4.5 dtex and a fiber length of 38 of 60 mm. The fibers thereof may be made of segmented or separated composite fibers and may be made into ultrafine fibers after web formation. A segmented fiber can be obtained by a method according to which different components of a composite fiber are arranged in a radial manner when the fiber is viewed cross-sectionally. A separated fiber can be obtained by a method in which the sea component of a sea-island type composite fiber is leached out, or a like method. According to such methods, the fineness, i.e., thinness, required in the finished product is attained. The air-laid web layer is preferably a web layer having a fineness of 0.6 to 3.3 dtex and a fiber length of 2 to 10 mm. A directly spun yarn can be used as the fibers thereof.

An inner layer C may be provided under the upper layer A described above. In this case, the surface nonwoven fabric layer A is composed of a group of fibers having a fineness of 0.05 to 1 dtex, a fiber length of 3 to 10 mm and a weight per unit area of 20 to 100 g/m$^2$ and an elastic polymer with which the group of fibers are impregnated, and the surface nonwoven fabric layer A has a density of 0.35 to 0.50 g/cm$^3$. The inner layer C is composed of a group of fibers having a fineness less fine than that in the surface layer A, a fiber length of 3 to 15 mm and a weight per unit area of 30 to 150 g/m$^2$ and an elastic polymer with which the group of fibers are impregnated, and the inner layer C has a density lower than that of the surface layer A and 0.30 to 0.45 g/cm$^3$. The fineness of the surface layer A is preferably 0.05 dtex or more in view of the productivity of a wet-laid nonwoven fabric, and preferably 0.6 dtex or less in view of surface smoothness. Moreover, the fineness of the inner layer C is preferably two to six times less fine than that of the surface layer A.

It is preferable that at least one of the groups of fibers in the upper layer A and the base nonwoven fabric B contains 70 to 95 parts by weight of primary fibers having a relatively high softening point SH and 5 to 30 parts by weight of secondary fibers having a relatively low softening point SL.

It is further preferable in the present invention that a reinforcement layer D is disposed between the upper layer A and the base nonwoven fabric B or between base nonwoven fabrics B, and the reinforcement layer D has a fineness less fine than that of the upper layer A, a weight per unit area of 30 to 200 g/m², a density of 0.25 to 0.35 g/cm³ and an air permeability of 3 to 250 cm³/cm²·sec according to JIS (Japanese Industrial Standards) L 1096 Method A. Due to the addition of the reinforcement layer D, the dimensional stability and strength are further enhanced. The reinforcement layer D may be arranged within the base nonwoven fabric layer B.

The reinforcement layer D is preferably at least one member selected from woven fabrics, knitted fabrics, spunbonded nonwoven fabrics and spunlaced nonwoven fabrics. When a woven fabric or knitted fabric is used, synthetic fiber filaments (continuous fibers) of, e.g., polyethylene terephthalate may be used, or a spun yarn may be used.

It is preferable that the reinforcement layer D has the following physical properties: an average of longitudinal bending resistance and lateral bending resistance (measured as having a thickness of 1 mm) according to JIS L 1096-8.19 Method A of 30 mm or more, and an elastic recovery rate at a force of 10 N measured according to JIS L 1059-1 (Monsanto method) of 50% or more.

When the air permeability of the reinforcement layer D provided between the upper and lower layer webs is less than 3 cm³/cm²·sec, the integration of the fabric with the upper and lower layer webs is not likely to be obtained. In contrast, when the air permeability exceeds 250 cm³/cm²·sec, the desired tautness and resilience comparable to natural leather may not be obtained even when a fiber bundle layer derived from the fabric is provided, or although tautness and resilience may be obtained, the integration may not be obtained, and the necessary strength is not likely to be obtained.

For the water-soluble polymer, two types of water-soluble polymers, i.e., one having a relatively low water dissolution temperature (DL) and water redissolution temperature (RL) and the other having a relatively high water dissolution temperature (DH) and water redissolution temperature (RH), also can be used simultaneously. The redissolution temperature is usually 20 to 40° C. lower than the dissolution temperature. In this case, the water-soluble polymer having a DL functions as a binder of primary fibers during the wet-laid process, and is mostly dissolved or removed by the hydroentanglement. In addition, when the hydroentanglement is performed at a temperature not higher than the DL (and preferably not lower than the RL), the water-soluble polymer having a DH remains after the hydroentanglement and secures the non-bonded state of the primary fibers and the elastic polymer during the impregnation with the elastic polymer solution. The water-soluble polymer having a DH is removed by washing or dyeing with hot water at a temperature not lower than the RH (e.g., 130° C. in case of PET) after the impregnation with the elastic polymer solution.

When the water-soluble polymer having a DL is used, it is preferable that, in the process performed before the hydroentanglement, the layered material is immersed in a warm bath having a temperature about the same as the water temperature of the hydroentanglement or higher. This is because the water-soluble polymer having a DL starts to dissolve in the warm bath and its binder function is cancelled, thereby enhancing the efficiency of hydroentanglement of the primary fibers, improving the removability of the nonwoven fabric from a dryer in the drying process after the hydroentanglement, making it unlikely to collect dirt, and also improving the softness of the nonwoven fabric.

To provide the substrate with a density gradient as described above, it is preferable that the nonwoven fabrics have a density gradient such that the density of the group of fibers in the surface layer is 0.18 to 0.30 g/cm³, the density of the group of fibers in the inner layer is 0.15 to 0.25 g/cm³, and the density of the group of fibers in the lower layer is 0.15 to 0.23 g/cm³.

Preferably, the fibers constituting the groups of fibers may be synthetic fibers, e.g., polyesters such as polyethylene terephthalate (PET), nylon and acryl, the water-soluble polymer may be polyvinyl alcohol, and the elastic polymer may be polyurethane. In the present invention, by controlling the density and the fineness of the base nonwoven fabric as well as the type and amount of polyvinyl alcohol and polyurethane, tautness, resilience and texture can be attained, and it is thus possible to create a texture like nubuck, which is an expensive material.

In place of the water-soluble polymer having a DL, part of the group of fibers in each web may be composed of fibers having a low softening point and may be used as a binder of the primary fibers. That is, at least one of the groups of fibers in the upper and lower layer webs may contain 70 parts or more of primary fibers having a relatively high softening point SH and secondary fibers having a relatively low softening point SL as the remainder, and drying after the wet-laid process may be performed at a temperature between SL and SH. This allows the secondary fibers to function as a binder in the drying process, and a web is obtained. Moreover, the secondary fibers remain after the hydroentanglement and functions in the same manner as the primary fibers in the artificial leather substrate.

For an example of a combination of the primary fibers and the secondary fibers, when the primary fibers are PET, the secondary fibers can be unstretched PET, sheath-core composite fibers (core: PET, sheath: PET copolymerized with sodium 5-sulfoisophthalate), or sheath-core composite fibers (core: polypropylene, sheath: polyethylene). These secondary fibers are not soluble in water, and therefore a sheet-forming machine that uses the wet-laid process or like equipment is not likely to collect dirt, thereby improving both quality stability and operating efficiency. Moreover, since the secondary fibers do not dissolve during the hydroentanglement, equipment such as a hydroentanglement machine does not collect dirt, and it is easy to reuse the water.

It is preferable that the fabric has the following physical properties: an average of longitudinal bending resistance and lateral bending resistance (measured as having a thickness of 1 mm) according to JIS L 1096-8.19 Method A of 30 mm or more, and an elastic recovery rate at a force of 10 N measured according to JIS L 1059-1 (Monsanto method) of 50% or more. When the fabric has a bending resistance of 45 mm or more and an elastic recovery rate of 75% or more, the resulting artificial leather is similar to cowhide. Examples of the fabric include triaxially woven fabrics, plainly woven fabrics, spunbonded fabrics, etc. Among such examples, in the case of an artificial leather application that is thick, resilient and similar to cowhide for use as bags, shoes and the like, a plain weave fabric using a hollow yarn and a polyurethane spun-bonded fabric (e.g., "Espancione" registered trade mark) manufactured by Kanebo Inc., or "Polyurethane MB unwoven fabric" manufactured by Kuraray Kuraflex Co., Ltd.) are suitable.

The artificial leather substrate of the present invention can be made into a suede-like artificial leather by napping the surface of the upper layer, and can be made into a full-grain artificial leather by attaching a sheet that contains polyurethane as the main component to the surface of the upper layer. In the present specification, the term "main component" refers to the component accounting for 50 wt % or more, and preferably 60 wt % or more.

Figure 1A:
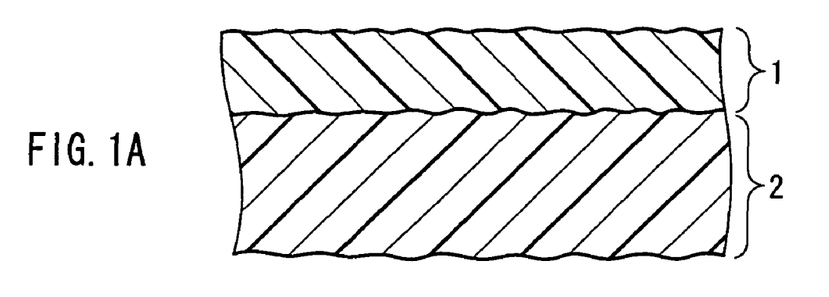
FIG. 1A is a cross-sectional view of an artificial leather substrate of one embodiment of the present invention.
Figure 1B:
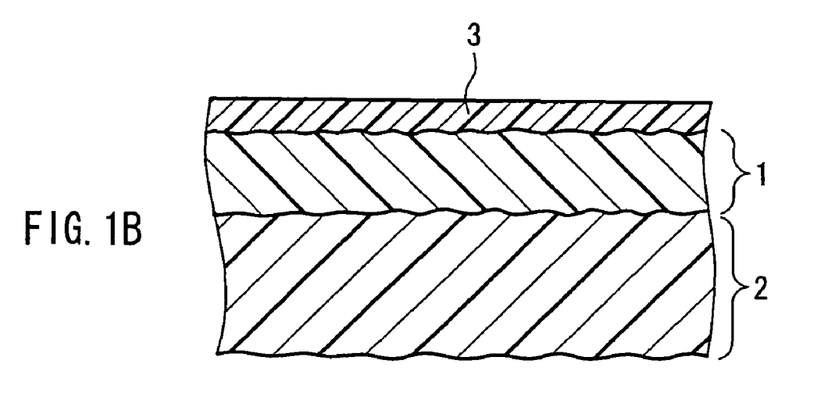
FIG. 1B is a cross-sectional view of full-grain artificial leather produced by attaching a laminate layer to the front surface of the artificial leather substrate of FIG. 1A.

FIG. 1A is a cross-sectional view of an artificial leather substrate of one embodiment of the present invention. The substrate contains an upper-layer nonwoven fabric A (1) composed of a wet-laid nonwoven fabric and a base nonwoven fabric B (2) composed of a dry-laid nonwoven fabric, and is made into a single body by injecting pressurized water in thickness directions to mutually entangle the component fibers of both layers. FIG. 1B is a cross-sectional view of full-grain artificial leather produced by attaching a laminate layer (3) containing polyurethane as the main component to the surface of the artificial leather substrate of FIG. 1A.

Figure 2:
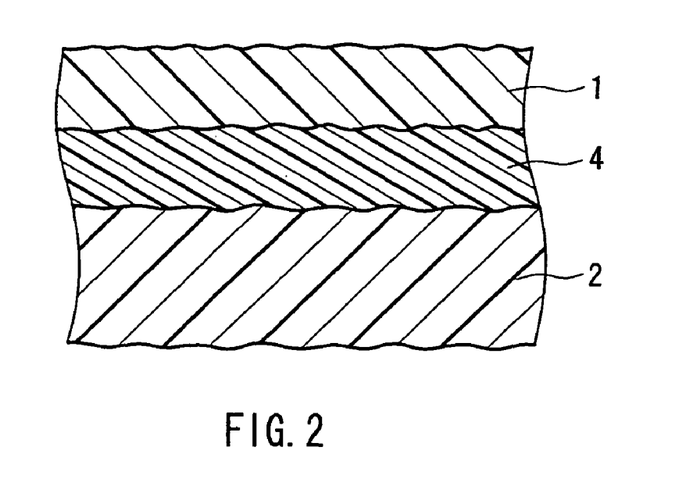
FIG. 2 is a cross-sectional view of an artificial leather substrate of another embodiment of the present invention.

FIG. 2 is a cross-sectional view of an artificial leather substrate of another embodiment of the present invention. The substrate contains an upper-layer nonwoven fabric A (1) composed of a wet-laid nonwoven fabric, a base nonwoven fabric B (2) and an inner layer (4) disposed therebetween, and is made into a single body by injecting pressurized water in thickness directions to mutually entangle the component fibers of the layers.

Figure 3:
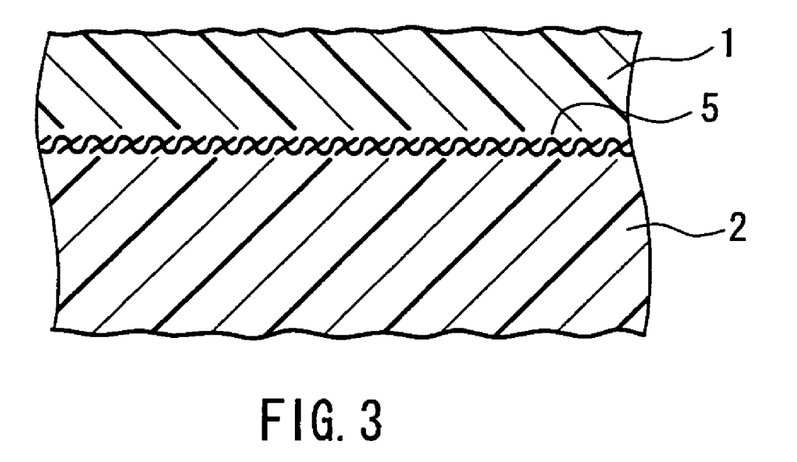
FIG. 3 is a cross-sectional view of an artificial leather substrate of yet another embodiment of the present invention.

FIG. 3 is a cross-sectional view of an artificial leather substrate of yet another embodiment of the present invention. The substrate contains an upper-layer nonwoven fabric A (1) composed of a wet-laid nonwoven fabric, a base nonwoven fabric B (2) composed of a dry-laid nonwoven fabric and a reinforcing layer (scrim) (5) disposed between the upper-layer nonwoven fabric A (1) and the base nonwoven fabric B (2), and is made into a single body by injecting pressurized water in thickness directions to mutually entangle the component fibers of the layers.

Figure 4:
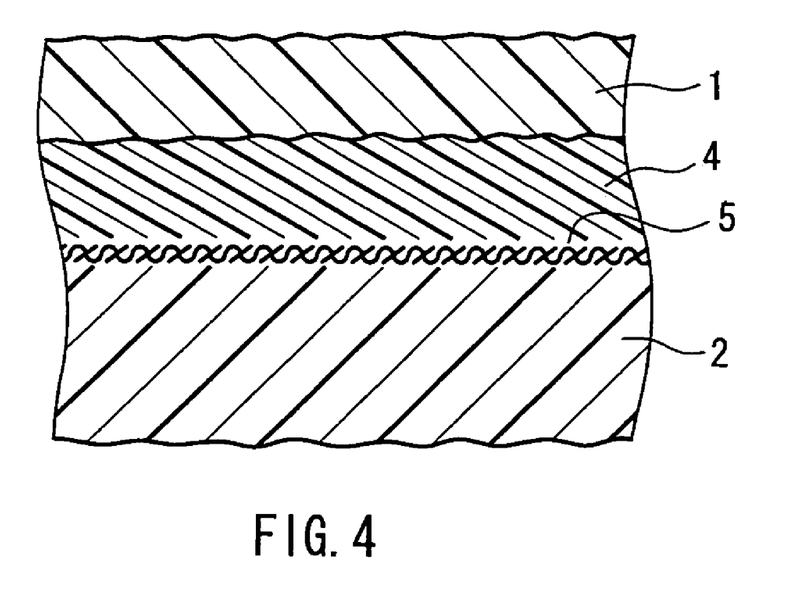
FIG. 4 is a cross-sectional view of an artificial leather substrate of yet another embodiment of the present invention.

FIG. 4 is a cross-sectional view of an artificial leather substrate of yet another embodiment of the present invention. An upper-layer nonwoven fabric A (1) composed of a wet-laid nonwoven fabric, an inner layer (4), a reinforcing layer (scrim) (5) and a base nonwoven fabric B (2) are disposed in this order, and is made into a single body by injecting pressurized water in thickness directions to mutually entangle the component fibers of the layers.

EXAMPLES

In the examples below, the term simply referred to as a "fiber" means a stretched synthetic fiber. In addition, "part" and "%" mean "part by weight" and "% by weight", respectively.

Example 1

Production of an Artificial Leather Substrate (1) Upper-Layer Nonwoven Fabric A Ninety five parts of polyester (PET) fibers (manufactured by Teijin Limited) having a fineness of 0.15 dtex and a fiber length of 5 mm and 5 parts of polyvinyl alcohol (PVA) fibers (herein after referred to as "VPW") having a water dissolution temperature of 60° C., a fineness of 1.0 dtex and a fiber length of 3 mm were dissolved in 50000 parts of water at ordinary temperatures, and a nonionic dispersant in a proportion of 1% and polyacrylamide (a thickening agent) in a proportion of 0.1% both relative to the water were added to improve the dispersibility of the fibers to give a first slurry for sheet forming. This first slurry was wet-laid using an inclined sheet-forming machine followed by drying, thereby giving a nonwoven fabric with a dry weight per unit area of 28.5 g/m².

(2) Base Nonwoven Fabric B1

A card web layer composed of polyester (PET) fibers having a fineness of 1.7 dtex, a fiber length of 51 mm, a weight per unit area of 220 g/m² and a density of 0.07 g/cm³ was prepared and used.

(3) Hydroentanglement

The upper-layer nonwoven fabric A and base nonwoven fabric B1 were layered with the fabric A on top and subjected to hydroentanglement at ordinary temperatures by applying water jets substantially alternately to the front surface and the back surface at various injection pressures ranging from 10 kg/cm² to 150 kg/cm² to give a nonwoven fabric (X-1) as shown on FIG. 1A. The thickness of the nonwoven fabric (X-1) was 1.09 mm and the density of the nonwoven fabric was 0.228 g/cm³.

(4) Elastic Polymer (Polyurethane) Impregnation

Next, the nonwoven fabric (X-1) was impregnated with a solution containing 13 parts of a composition containing polyester polyurethane (PU) as the main component, 86.6 parts of organic solvent DMF and 0.4 parts of a coagulation adjusting agent. After polyurethane coagulation at 28° C. in a 30% aqueous dimethylformamide (DMF) solution, the fabric was washed with water and with hot water at 80° C. or higher, and was dried, thereby giving an artificial leather substrate (Y-1) having a thickness of 1.09 mm and a weight per unit area of 325.5 g/m². Table 1 shows the weight per unit area of each layer, the density of the group of fibers in each layer and the density of each layer calculated from the thickness of the substrate (Y-1).

TABLE 1

|  | Weight per unit area | | | Density of fibers (g/m²) | Thickness (mm) | Density of layer (g/cm³) |
| --- | --- | --- | --- | --- | --- | --- |
|  | 1. PET (g/m²) | 2. PU (g/m²) | 1 + 2 | | | |
| Upper-layer nonwoven fabric A | 28.5 | 17 | 45.5 | 0.26 | 0.11 | 0.41 |
| Base nonwoven fabric B1 | 220 | 60 | 280 | 0.22 | 0.98 | 0.29 |
| Total | 248.5 | 77 | 325.5 | | 1.09 | 0.30 |

[Production of Artificial Leather with Grain Finish]

The front surface (the surface on the surface layer web side) and the back surface (the surface on the base nonwoven fabric side) of the substrate (Y-1) were applied to a buffing machine of a belt sander type (A-5N, manufactured by Meinan Machinery Works, Inc.) and subjected to a buffing treatment using 240-mesh paper rotating at a rate of 600 m/min to form fiber-napped surfaces. Subsequently, relaxation treatment was performed in hot water using a jet dyeing machine (CUT-SR-2L, manufactured by Hisaka Works, Ltd.) followed by drying.

Separately, a composition was prepared by blending 100 parts of polyurethane (obtained by polymerizing polycarbonatediol, polytetramethylene glycol, polyethylene glycol and 4,4'-dicyclohexanemethane diisocyanate), 28 parts of carbon black and 35 parts of DMF. The composition was applied to a release paper in an amount of 125 g/m². A liquid mixture containing 100 parts of two-component polyurethane, 10 parts of a crosslinking agent, 1.5 parts of a crosslinking accelerator and 20 parts of a solvent or the like was applied as an adhesive layer over the release paper in an amount of 155 g/m². This film was press-bonded to the surface of the substrate (Y-1) after the aforementioned relaxation treatment while the adhesive layer was in the state of having adhesiveness immediately after drying, and allowed to stand at 60° C. for 48 hours, and then the release paper was removed to give full-grain artificial leather (Z-1) as shown on FIG. 1B. After further being subjected to rubbing treatment, this artificial leather exhibited a soft texture with good tautness and resilience, and thus was suitable for clothing and bags.

Example 2

(1) An upper-layer nonwoven fabric A prepared as in Example 1 was used.

(2) Base Nonwoven Fabric B2

PET having a fineness of 0.6 dtex, a fiber length of 5 mm and a weight per unit area of 250 g/m² and PVA-VPB 102 having a fineness of 1.1 dtex, a fiber length of 5 mm and 25 g/m² were subjected to fiber blending, thereby giving a polyester/PVA air-laid web layer having a weight per unit area of 275 g/m² and a density of 0.125 g/cm³.

(3) Hydroentanglement

Hydroentanglement was performed in the same manner as in Example 1 to give a nonwoven fabric (X-2) as shown on FIG. 1A.

(4) Elastic Polymer (Polyurethane) Impregnation

Polyurethane impregnation was performed in the same manner as in Example 1. Table 2 shows the weight per unit area of each layer, the density of the group of fibers in each layer, and the density of each layer calculated from the thickness of the resulting substrate (Y-2).

TABLE 2

|  | Weight per unit area | | | Density of fibers (g/m²) | Thickness (mm) | Density of layer (g/cm³) |
|---|---|---|---|---|---|---|
|  | 1. PET (g/m²) | 2. PU (g/m²) | 1 + 2 | | | |
| Upper-layer nonwoven fabric A | 28.5 | 17 | 45.5 | 0.26 | 0.11 | 0.41 |
| Base nonwoven fabric B2 | 250.0 | 65 | 315.0 | 0.23 | 1.10 | 0.29 |
| Total | 280.0 | 82 | 360.5 | | 1.21 | 0.30 |

[Production of Artificial Leather with Grain Finish]

The front surface (the surface on the surface layer web side) and the back surface (the surface on the base nonwoven fabric side) of the substrate (Y-2) were subjected to grain finishing in the same manner as in Example 1. The resulting full-grain artificial leather (Z-2) (FIG. 1B) exhibited a soft texture with good tautness and resilience, and thus was suitable for winter clothing such as overcoats.

Example 3

(1) Upper-layer nonwoven fabrics A were prepared in the same manner as in Example 1 using the wet-laid nonwoven fabrics shown on Table 3 below. The ultrafine fibers for use in the upper-layer nonwoven fabrics A in Experiment Nos. 1, 2, 3, and 6-33 were prepared using radially segmented composite fibers composed of two components, i.e., polyethylene terephthalate and nylon 6, and obtained by forming nonwoven fabrics and then performing segmenting treatment. A directly spun polyethylene terephthalate yarn was used as the fibers for use in the upper-layer nonwoven fabric A of the experiment nos. 4 and 5.

(2) For use as base nonwoven fabrics B, air-laid web layers were prepared in the same manner as in Example 2.

(3) Hydroentanglement

Hydroentanglement was performed in the same manner as in Example 1 to give nonwoven fabrics as shown on FIG. 1A.

(4) Elastic Polymer (Polyurethane) Impregnation

Polyurethane impregnation was performed in the same manner as in Example 1.

Table 3 shows the details and results.

TABLE 3

| | Upper-layer nonwoven fabric A | | | | Base nonwoven fabric B | | | | |
|---|---|---|---|---|---|---|---|---|---|
| Ex. No. | Fineness (dtex) | Fiber length (mm) | Weight per unit area (g/m²) | Density (g/cm³) | Fineness (dtex) | Fiber length (mm) | Weight per unit area (g/m²) | Density (g/cm³) | Evaluation |
| 1 | 0.025 | 5 | 70 | 0.48 | 2.0 | 8 | 200 | 0.20 | A |
| 2 | 0.05 | 5 | 70 | 0.43 | 2.0 | 8 | 200 | 0.20 | A |
| 3 | 0.3 | 5 | 70 | 0.4 | 2.0 | 8 | 200 | 0.20 | A |
| 4 | 1.1 | 5 | 70 | 0.37 | 2.0 | 8 | 200 | 0.20 | A |
| 5* | 1.7 | 5 | 70 | 0.4 | 2.0 | 8 | 200 | 0.20 | B |
| 6* | 0.5 | 2 | 70 | 0.4 | 2.0 | 8 | 200 | 0.20 | B |
| 7 | 0.5 | 3 | 70 | 0.4 | 2.0 | 8 | 200 | 0.20 | A |
| 8 | 0.5 | 10 | 70 | 0.4 | 2.0 | 8 | 200 | 0.20 | A |
| 9* | 0.5 | 20 | 70 | — | 2.0 | 8 | 200 | 0.20 | C |
| 10* | 0.5 | 5 | 20 | 0.30 | 2.0 | 8 | 200 | 0.20 | B |
| 11 | 0.5 | 5 | 30 | 0.37 | 2.0 | 8 | 200 | 0.20 | A |
| 12 | 0.5 | 5 | 150 | 0.48 | 2.0 | 8 | 200 | 0.20 | A |
| 13* | 0.5 | 5 | 160 | 0.51 | 2.0 | 8 | 200 | 0.20 | B |
| 14* | 0.5 | 5 | 70 | 0.2 | 2.0 | 8 | 200 | 0.20 | B |
| 15 | 0.5 | 5 | 70 | 0.3 | 2.0 | 8 | 200 | 0.20 | A |
| 16 | 0.5 | 5 | 70 | 0.5 | 2.0 | 8 | 200 | 0.20 | A |
| 17* | 0.5 | 5 | 70 | 0.6 | 2.0 | 8 | 200 | 0.20 | B |
| 18 | 0.5 | 5 | 70 | 0.2 | 8 | 200 | 0.28 | A |
| 19 | 0.5 | 5 | 70 | 0.4 | 0.6 | 8 | 200 | 0.23 | A |
| 20 | 0.5 | 5 | 70 | 0.4 | 4.5 | 8 | 200 | 0.23 | A |
| 21* | 0.5 | 5 | 70 | 0.4 | 5.0 | 8 | 200 | 0.15 | B |
| 22* | 0.5 | 5 | 70 | 0.4 | 2.0 | 1 | 200 | — | C |
| 23 | 0.5 | 5 | 70 | 0.4 | 2.0 | 2 | 200 | 0.23 | A |

TABLE 3-continued

| | Upper-layer nonwoven fabric A | | | | Base nonwoven fabric B | | | | |
|---|---|---|---|---|---|---|---|---|---|
| Ex. No. | Fineness (dtex) | Fiber length (mm) | Weight per unit area (g/m²) | Density (g/cm³) | Fineness (dtex) | Fiber length (mm) | Weight per unit area (g/m²) | Density (g/cm³) | Evaluation |
| 24 | 0.5 | 5 | 70 | 0.4 | 2.0 | 15 | 200 | 0.23 | A |
| 25 | 0.5 | 5 | 70 | 0.4 | 2.0 | 50 | 200 | 0.26 | A |
| 26* | 0.5 | 5 | 70 | 0.4 | 2.0 | 8 | 40 | 0.36 | B |
| 27 | 0.5 | 5 | 70 | 0.4 | 2.0 | 8 | 50 | 0.28 | A |
| 28 | 0.5 | 5 | 70 | 0.4 | 2.0 | 8 | 400 | 0.28 | A |
| 29* | 0.5 | 5 | 70 | 0.4 | 2.0 | 8 | 500 | 0.30 | B |
| 30* | 0.5 | 5 | 70 | 0.4 | 2.0 | 8 | 200 | 0.10 | B |
| 31 | 0.5 | 5 | 70 | 0.4 | 2.0 | 8 | 200 | 0.15 | A |
| 32 | 0.5 | 5 | 70 | 0.4 | 2.0 | 8 | 200 | 0.28 | A |
| 33* | 0.5 | 5 | 70 | 0.4 | 2.0 | 8 | 200 | 0.33 | B |

Notes:
Asterisks (*) indicate comparative examples.
An "A" evaluation means that the obtained materials had tautness and resilience that were suitable in artificial leather for clothing such as overcoats and were thus sufficient for practical use.
A "B" evaluation means that the obtained materials were of unacceptable quality. The surface smoothness attained in Experiment Nos. 5, 6, 10 and 14 was not preferable, the surface texture attained in Nos. 13 and 17 was hard and rough, the dimensional stability and strength of the base nonwoven fabrics B attained in Nos. 22 and 30 were not preferable, and the surface texture attained in Nos. 21, 26, 29 and 33 was hard and thus not preferable.
A "C" evaluation means that experiments could not be performed. Sheet forming by the wet-laid process could not be stably performed in No. 9 due to excessively long fiber lengths, and in No. 22 fibers could not be entangled due to their excessively short lengths, both failing to give unwoven fabrics that could be subjected to subsequent processes.

Example 4

(1) Upper-layer nonwoven fabrics A were prepared in the same manner as in Example 1 using the wet-laid nonwoven fabrics shown on Table 4.
(2) Base Nonwoven Fabric B1
For base nonwoven fabrics B, card web layers composed of polyester (PET) fibers were prepared in the same manner as in Example 1 and used.
(3) Hydroentanglement
Hydroentanglement was performed in the same manner as in Example 1 to give a nonwoven fabric as shown on FIG. 1A.
(4) Elastic Polymer (Polyurethane) Impregnation
Polyurethane impregnation was performed in the same manner as in Example 1.
Table 4 shows the details and results.

Example 5

(1) Upper-Layer Nonwoven Fabric (Surface Layer) A
The upper-layer nonwoven fabric of Example 1 was used as the surface layer.
(2) Inner Layer C Disposed Under the Upper-Layer Nonwoven Fabric A
A second sheet-forming slurry was prepared by dissolving and dispersing, in the same manner as the first sheet-forming slurry, 90 parts of polyester fibers (manufactured by Teijin Limited) having a fineness of 0.3 dtex and a fiber length of 5 mm, 5 parts of VPW fibers and 5 parts of PVA fibers (hereinafter referred to as "VPB") having a water dissolution temperature of 99° C., a fineness of 1.0 dtex and a fiber length of 5 mm. This second slurry was wet-laid using an inclined

TABLE 4

| | Upper-layer nonwoven fabric A | | | | Base nonwoven fabric B | | | | |
|---|---|---|---|---|---|---|---|---|---|
| Ex. No. | Fineness (dtex) | Fiber length (mm) | Weight per unit area (g/m²) | Density (g/cm³) | Fineness (dtex) | Fiber length (mm) | Weight per unit area (g/m²) | Density (g/cm³) | Evaluation |
| 34 | 0.15 | 5 | 45.5 | 0.36 | 0.8 | 51 | 200 | 0.20 | A |
| 35 | 0.15 | 5 | 45.5 | 0.36 | 1.0 | 51 | 200 | 0.20 | A |
| 36 | 0.15 | 5 | 45.5 | 0.36 | 4.5 | 51 | 200 | 0.20 | A |
| 37 | 0.15 | 5 | 45.5 | 0.36 | 5.0 | 51 | 200 | 0.20 | A |
| 38 | 0.15 | 5 | 45.5 | 0.36 | 1.7 | 30 | 200 | 0.20 | A |
| 39 | 0.15 | 5 | 45.5 | 0.36 | 1.7 | 38 | 200 | 0.20 | A |
| 40 | 0.15 | 5 | 45.5 | 0.36 | 1.7 | 60 | 200 | 0.20 | A |
| 41* | 0.15 | 5 | 45.5 | 0.36 | 1.7 | 65 | 200 | 0.20 | B |
| 42* | 0.15 | 5 | 45.5 | 0.36 | 1.7 | 51 | 40 | 0.20 | B |
| 43 | 0.15 | 5 | 45.5 | 0.36 | 1.7 | 51 | 50 | 0.20 | A |
| 44 | 0.15 | 5 | 45.5 | 0.36 | 1.7 | 51 | 400 | 0.20 | A |
| 45* | 0.15 | 5 | 45.5 | 0.36 | 1.7 | 51 | 500 | 0.20 | B |
| 46* | 0.15 | 5 | 45.5 | 0.36 | 1.7 | 51 | 200 | 0.13 | B |
| 47 | 0.15 | 5 | 45.5 | 0.36 | 1.7 | 51 | 200 | 0.15 | A |
| 48 | 0.15 | 5 | 45.5 | 0.36 | 1.7 | 51 | 200 | 0.28 | A |
| 49* | 0.15 | 5 | 45.5 | 0.36 | 1.7 | 51 | 200 | 0.30 | B |

Notes:
Asterisks (*) indicate comparative examples.
An "A" evaluation means that the obtained materials had tautness and resilience suitable as artificial leather for clothing such as overcoats and thus were sufficient for practical use.
A "B" evaluation means that the obtained materials were of unacceptable quality. The surface smoothness attained in Experiment No. 41 was not preferable, the surface texture attained in Nos. 45 and 49 was hard and rough, and the dimensional stability and strength of the base nonwoven fabrics B attained in Nos. 42 and 46 were not preferable.

sheet-forming machine, thereby giving an inner layer C having a dry weight per unit area of 30 g/m².

(3) Woven Reinforcement Layer D1

A polyester plain weave fabric (D1) using a 75 dtex/24 filament yarn (monofilament fineness: 3.125 dtex) and having a weaving density of 68 warps/inch and 58 wefts/inch, an air permeability of 141 cm³/cm²·sec, a (longitudinal/lateral) bending resistance of 34 mm/37 mm (hereinafter, "longitudinal/lateral" and "mm" will be omitted) and an elastic recovery rate of 84% was prepared.

(4) Base Nonwoven Fabric B

The base nonwoven fabric B1 of Example 1 was used as a base nonwoven fabric B.

(5) Hydroentanglement

The surface layer A, inner layer C, plain weave fabric (D1) and base nonwoven fabric B were layered with the surface layer A on top, and subjected to hydroentanglement at ordinary temperatures by applying water jets substantially alternately to the front surface and the back surface at various injection pressures ranging from 10 kg/cm² to 225 kg/cm² to give a nonwoven fabric (X-3) as shown on FIG. 4.

(6) Elastic Polymer (Polyurethane) Impregnation

The nonwoven fabric (X-3) was impregnated with a solution containing 13 parts of a composition containing polyester polyurethane as the main component, 86.6 parts of organic solvent DMF and 0.4 parts of a coagulation adjusting agent. After polyurethane coagulation at 28° C. in a 30% aqueous DMF solution, the fabric was washed with water and with hot water at 80° C. or higher, and was dried, thereby giving an artificial leather substrate (Y-3) having a thickness of 1.36 mm and a weight per unit area of 425.5 g/m². Table 5 shows, for the substrate (Y-3), the weight per unit area of each layer, the density of the group of fibers in each layer, and the density of each layer calculated from the thickness.

TABLE 5

|  | Weight per unit area | | | Density of fibers (g/m²) | Thickness (mm) | Density of layer (g/cm³) |
| --- | --- | --- | --- | --- | --- | --- |
|  | 1. PET (g/m²) | 2. PU (g/m²) | 1 + 2 |  |  |  |
| Upper-layer nonwoven fabric A | 28.5 | 17 | 45.5 | 0.285 | 0.10 | 0.455 |
| Inner layer C | 27.0 | 14.0 | 41.0 | 0.270 | 0.10 | 0.410 |
| Knitted reinforcement layer D1 | 50.0 | 9.0 | 59.0 | 0.278 | 0.18 | 0.328 |
| Base nonwoven fabric B | 220.0 | 60.0 | 280.0 | 0.224 | 0.98 | 0.286 |
| Total | 325.5 | 100.0 | 425.5 |  | 1.36 | 0.313 |

The front surface (the surface on the surface layer web side) and the back surface (the surface on the base nonwoven fabric side) of the substrate (Y-3) were subjected to grain finishing in the same manner as in Example 1. The full-grain artificial leather (Z-3) thus obtained exhibited a soft texture with good tautness and resilience, and thus was suitable for shoes/bags, furniture and automobile seats.

Example 6

In place of the woven reinforcement layer D1 of Example 5, a knitted fabric (D2) of a tricot fabric (knitting density: course: 40/inch, wale: 34/inch, air permeability of 152 cm³/cm² sec, (longitudinal/lateral) bending resistance of 37 mm/45 mm, rate of elastic recovery of 76% and weight per unit area of 62.0 g/m²) using polyethylene terephthalate fibers of a 50 dtex/24 filament yarn (single yarn fineness: 2.08 dtex) was prepared as a knitted reinforcement layer D2. Otherwise, an experiment was carried out in the same manner as in Example 5. Table 6 shows the weight per unit area of each layer, the density of the group of fibers in each layer, and the density of each layer calculated from the thickness of the resulting substrate (Y-4).

TABLE 6

|  | Weight per unit area | | | Density of fibers (g/m²) | Thickness (mm) | Density of layer (g/cm³) |
| --- | --- | --- | --- | --- | --- | --- |
|  | 1. PET (g/m²) | 2. PU (g/m²) | 1 + 2 |  |  |  |
| Upper-layer nonwoven fabric A | 28.5 | 17.0 | 45.5 | 0.285 | 0.10 | 0.455 |
| Inner layer C | 27.0 | 14.0 | 41.0 | 0.270 | 0.10 | 0.410 |

TABLE 6-continued

|  | Weight per unit area | | | Density of fibers (g/m²) | Thickness (mm) | Density of layer (g/cm³) |
|---|---|---|---|---|---|---|
|  | 1. PET (g/m²) | 2. PU (g/m²) | 1 + 2 | | | |
| Knitted reinforcement layer D2 | 62.0 | 14.0 | 76.0 | 0.281 | 0.22 | 0.345 |
| Base nonwoven fabric B | 220.0 | 58.0 | 278.0 | 0.229 | 0.96 | 0.290 |
| Total | 337.5 | 103.0 | 438.5 | | 1.38 | 0.318 |

The front surface (the surface on the surface layer web side) and the back surface (the surface on the base nonwoven fabric side) of the substrate (Y-4) were subjected to grain finishing in the same manner as in Example 1. The full-grain artificial leather (Z-4) thus obtained exhibited a soft texture with good tautness and resilience, and thus was suitable for clothing such as overcoats, or shoes.

Example 7

In place of the woven reinforcement layer D1 of Example 5, a spunbonded nonwoven fabric composed of polyethylene terephthalate fibers having a single yarn fineness of 2.3 dtex and a weight per unit area of 50.0 g/m² was prepared as a nonwoven fabric reinforcement layer D3. Otherwise, an experiment was carried out in the same manner as in Example 5. Table 7 shows, for the resulting substrate (Y-5), the weight per unit area of each layer, the density of the group of fibers in each layer, and the density of each layer calculated from the thickness.

TABLE 7

|  | Weight per unit area | | | Density of fibers (g/m²) | Thickness (mm) | Density of layer (g/cm³) |
|---|---|---|---|---|---|---|
|  | 1. PET (g/m²) | 2. PU (g/m²) | 1 + 2 | | | |
| Upper-layer nonwoven fabric A | 28.5 | 17.0 | 45.5 | 0.285 | 0.10 | 0.455 |
| Inner layer C | 27.0 | 14.0 | 41.0 | 0.270 | 0.10 | 0.410 |
| Spunbonded nonwoven reinforcement layer D3 | 50.0 | 8.0 | 58.0 | 0.263 | 0.19 | 0.305 |
| Base nonwoven fabric B | 220.0 | 60.0 | 280.0 | 0.244 | 0.98 | 0.286 |
| Total | 325.5 | 100.0 | 424.5 | | 1.35 | 0.314 |

The front surface (the surface on the surface layer web side) and the back surface (the surface on the base nonwoven fabric side) of the substrate (Y-5) were subjected to grain finishing in the same manner as in Example 1. The full-grain artificial leather (Z-5) thus obtained exhibited a soft texture with good tautness and resilience, and thus was suitable for shoes and bags as well as furniture.

Example 8

An upper-layer nonwoven fabric A as used in Example 1 was used. A nonwoven fabric having 190 g/m², a thickness of 1.05 mm and a density of 0.181 g/cm³ was prepared as a base nonwoven fabric B according to the needle punch method using a card web composed of short PET fibers having a fineness of 1.1 dtex and a fiber length of 51 mm.

(1) Hydroentanglement

The upper-layer woven fabric A and the base nonwoven fabric B1 were layered with the fabric A on top and was subjected to hydroentanglement at ordinary temperatures by applying water jets substantially alternately to the front surface and the back surface using a nozzle strip having a nozzle diameter of 80 μm or less and a nozzle pitch of 40/inch or more (the number of injectors, i.e., 6, was half the number of injectors used in Example 1) at an injection pressure of 30 kg/cm² to 200 kg/cm² to give a nonwoven fabric. The thickness of the nonwoven fabric was then 1.06 mm and the density of the nonwoven fabric was 0.206 g/cm³.

TABLE 8

|  | Weight per unit area | | | Density of fibers (g/m²) | Thickness (mm) | Density of layer (g/cm³) |
|---|---|---|---|---|---|---|
|  | 1. PET (g/m²) | 2. PU (g/m²) | 1 + 2 | | | |
| Upper-layer nonwoven fabric A | 28.5 | 17 | 45.5 | 0.259 | 0.11 | 0.418 |
| Base nonwoven fabric B | 190 | 90.0 | 280.0 | 0.181 | 0.95 | 0.295 |
| Total | 218.5 | 107.0 | 325.5 | | 1.06 | 0.307 |

(2) Surface Treatment

The front surface (the surface on the surface layer web side) and the back surface (the surface on the base nonwoven fabric side) of the substrate were subjected to grain finishing. The full-grain artificial leather thus obtained exhibited a soft texture with good tautness and resilience, and was suitable for shoes and bags as well as furniture.

Example 9

An upper-layer nonwoven fabric A as used in Example 1 was used. Used as a base nonwoven fabric B was a spunlaced fabric that had 200 g/m², a thickness of 0.80 mm and a density of 0.250 g/cm³ and that was composed of short fibers using PET/nylon 6 (NY)=70/30 segmented composite fibers having a pre-segmenting fineness of 2.8 dtex, post-segmenting fineness of 0.175 dtex and a fiber length of 36 mm.

(1) Hydroentanglement

The upper-layer woven fabric A and the base nonwoven fabric B1 were layered with the fabric A on top and subjected to hydroentanglement at ordinary temperatures by applying water jets substantially alternately to the front surface and the back surface using a nozzle strip having a nozzle diameter of 80 μm or less and a nozzle pitch of 40/inch or more (the number of injectors, i.e., 6, was half the number of injectors use d in Example 1) at an injection pressure of 30 kg/cm² to 200 kg/cm² to give a nonwoven fabric. The thickness of the nonwoven fabric was then 0.91 mm and the density of the nonwoven fabric was 0.251 g/cm³.

(manufactured by Teijin Limited) and, in place of the PVA fibers used in Example 1, 20 parts of polyester fibers having a softening point of 120° C. (fineness: 0.25 dtex, fiber length: 3 mm, manufactured by Teijin Limited), and dried at 125 to 130° C., thereby giving a wet-laid nonwoven fabric having a weight per unit area of 50 g/m².

(2) Base Nonwoven Fabric B

A spunlaced nonwoven fabric (PET/PA (polyamide)=70/30 (16 segments)) having a fineness of 2.8 dtex (post-segmenting fineness: about 0.17 dtex), a fiber length of 36 mm, a thickness of 0.36 mm, 85 g/m² and a density of 0.236 g/cm³ (manufactured by Japan Vilene Co., Ltd.) was used.

(3) Hydroentanglement

The upper-layer nonwoven fabric A and the base nonwoven fabric B were layered with the fabric A on top, and hydroentanglement was performed in the same manner as in Example 1, thereby giving a sheet of nonwoven fabric having a weight of 132 g/m², a thickness of 0.50 mm and a density of 0.264 g/cm³ (FIG. 1A).

(4) Pre-Treatment, Polyurethane Impregnation

Pre-treatment was performed in the same manner as in Example 1, thereby giving a sheet of nonwoven fabric that had a weight of 154 g/m², a thickness of 0.50 mm and a density of 0.308 g/cm³ and that was suitable for use in an artificial leather substrate.

(5) Surface Treatment

Dyeing was then performed in the same manner as in Example 1. As a result, supple and elegant suede-like artificial leather was obtained.

TABLE 9

|  | Weight per unit area | | | Density of fibers (g/m²) | Thickness (mm) | Density of layer (g/cm³) |
|---|---|---|---|---|---|---|
|  | 1. Fiber (g/m²) | 2. PU (g/m²) | 1 + 2 |  |  |  |
| Upper-layer nonwoven fabric A | 28.5 | 17 | 46.0 | 0.259 | 0.11 | 0.418 |
| Base nonwoven fabric B | 200.0 | 61.5 | 261.5 | 0.250 | 0.80 | 0.325 |
| Total | 228.5 | 79.0 | 307.5 |  | 0.91 | 0.338 |

Surface Treatment

The nonwoven fabric obtained in Example 9 was subjected to relaxation treatment in hot water and dried. Then, 100 parts by weight of the nonwoven fabric was impregnated with 160 parts by weight of a 5 wt % PVA solution and dried.

Thereafter, the front surface and the back surface were subjected to sanding using 400-mesh sandpaper and 240-mesh sandpaper, respectively. The front surface was coated with a 22 wt % aqueous mixed solution of PVA and CMC (carboxymethyl cellulose) and dried. Next, impregnation with a 15% DMF solution of polyether polyurethane elastomer was performed, the polyurethane was coagulated in a 20% aqueous DMF solution, and sufficient hot-water washing was carried out to remove the PVA fibers, PVA sizing agent and CMC by elution. Then, dyeing was performed using a disperse dye at 130° C. for 60 minutes, followed by reduction cleaning. After drying, the front surface was brushed, thereby giving an extremely elegant suede-like artificial leather that was suitable for clothing.

Example 10

(1) Upper-Layer Nonwoven Fabric A

A sheet-forming slurry for an upper-layer nonwoven fabric A was prepared in the same manner as in Example 1 using, as the main component fibers, 80 parts of polyester (PET) fibers having a fineness of 0.15 dtex and a fiber length of 5 mm

[Production of Artificial Leather with Grain Finish]

The above-described procedure was carried out up to step (4), and graining was performing in the same manner as in Example 1. The resulting full-grain artificial leather was artificial leather suitable for clothing such as ladies' shoes and ladies' half-length coats.

[Production of Dyed Artificial Leather]

The above-described procedure was carried out up to step (3), and without performing step (4), a sheet of nonwoven fabric was subjected to dyeing. Dyeing was performed using a dispersion dye at 130° C. for 60 minutes, followed by reductive washing. After drying, the front surface was brushed, giving extremely elegant suede-like artificial leather having 195 g/m² and a density of 0.30 g/cm³. Finally, the artificial leather was dipped into a finishing agent of an amino silicone type to attain a slick feel.

The resulting dyed product was a suede-like sheet tauter and more resilient than knitted suede-like materials due to the presence of density gradient and fineness gradient in the structure although the dyed product had not undergone polyurethane impregnation. The dyed product was suitable for clothing such as ladies' suits, dresses and skirts.

The invention claimed is:

1. An artificial leather substrate, the artificial leather substrate being in the form of a sheet and comprising an upper-layer nonwoven fabric A and a base nonwoven fabric B, the upper-layer nonwoven fabric A being a wet-laid nonwoven fabric having a density of 0.30 to 0.50 g/cm³ and being produced with synthetic fibers in which component fibers have a fineness of 0.005 to 1.1 dtex, a fiber length of 3 to 10 mm and a weight per unit area of 20 to 150 g/m², the base nonwoven fabric B being a layer of a nonwoven fabric having a density of 0.15 g/cm³ or more and less than 0.28 g/cm³ and being produced with synthetic fibers in which component fibers have a fineness less fine than that of the component fibers of the upper-layer nonwoven fabric A and 4.5 dtex or less, a fiber length of 2 to 60 mm and a weight per unit area of 50 to 400 g/m², the upper-layer nonwoven fabric A and the base nonwoven fabric B being layered, made into a single body by entanglement of the component fibers of both layers, and impregnated with an elastic polymer.

2. The artificial leather substrate according to claim 1, wherein the base nonwoven fabric B is one nonwoven fabric selected from the group consisting of a nonwoven fabric comprising a card web having a fiber length of 38 of 60 mm and a nonwoven fabric comprising an air-laid web having a fiber length of 2 to 15 mm.

3. The artificial leather substrate according to claim 1 further comprising an inner layer C between the upper-layer nonwoven fabric A and the base nonwoven fabric B, the inner layer C having a fineness less fine than that in the upper-layer nonwoven fabric A, a fiber length of 3 to 15 mm, a weight per unit area of 30 to 150 g/m² and a density lower than that of the upper-layer nonwoven fabric A and 0.30 to 0.45 g/cm³.

4. The artificial leather substrate according to claim 1, wherein at least one of the groups of fibers in the upper-layer nonwoven fabric A and the base nonwoven fabric B comprises 70 to 95 parts by weight of primary fibers having a relatively high softening point SH and 5 to 30 parts by weight of secondary fibers having a relatively low softening point SL.

5. The artificial leather substrate according to claim 3, wherein the fineness of the upper-layer nonwoven fabric A is 0.05 to 0.6 dtex.

6. The artificial leather substrate according to claim 1, further comprising a reinforcement layer D disposed between the upper-layer nonwoven fabric A and the base nonwoven fabric B, or disposed more towards the center than the base nonwoven fabric B, the reinforcement layer D having a fineness less fine than that of the upper-layer nonwoven fabric A, a weight per unit area of 30 to 200 g/m², a density of 0.25 to 0.35 g/cm³ and an air permeability of 3 to 250 cm³/cm²·sec according to JIS L 1096 Method A.

7. The artificial leather substrate according to claim 6, wherein the reinforcement layer D is at least one member selected from the group consisting of woven fabrics, knitted fabrics and nonwoven fabrics.

8. The artificial leather substrate according to claim 6, wherein the reinforcement layer D has an average of longitudinal bending resistance and lateral bending resistance (measured as having a thickness of 1 mm) according to JIS L 1096-8.19 Method A of 30 mm or more and an elastic recovery rate at a force of 10 N measured according to JIS L 1059-1 (Monsanto method) of 50% or more.

9. Artificial leather comprising the artificial leather substrate according to claim 1, wherein the surface of the upper-layer nonwoven fabric A is napped.

10. Artificial leather comprising the artificial leather substrate according to claim 1, wherein a sheet containing polyurethane as a main component is attached to the upper-layer nonwoven fabric A in the artificial leather substrate.

11. A method for producing a sheet of an artificial leather substrate comprising an upper-layer nonwoven fabric A and a base nonwoven fabric B, the upper-layer nonwoven fabric A being a wet-laid nonwoven fabric having a density of 0.30 to 0.50 g/cm³ and being produced with synthetic fibers in which component fibers have a fineness of 0.005 to 1.1 dtex, a fiber length of 3 to 10 mm and a weight per unit area of 20 to 150 g/m², the base nonwoven fabric B being a layer of a nonwoven fabric having a density of 0.15 g/cm³ or more and less than 0.28 g/cm³ and being produced with synthetic fibers in which component fibers have a fineness less fine than that of the component fibers of the upper-layer nonwoven fabric A and 4.5 dtex or less, a fiber length of 2 to 60 mm and a weight per unit area of 50 to 400 g/m², the method comprising the steps of layering the upper-layer nonwoven fabric A and the base nonwoven fabric B, injecting pressurized water in thickness directions to make the upper-layer nonwoven fabric A and the base nonwoven fabric B into a single body by entanglement of the component fibers of both layers, and impregnating the fabrics with an elastic polymer.

12. The method for producing an artificial leather substrate according to claim 11, wherein the base nonwoven fabric B is one nonwoven fabric selected from the group consisting of a nonwoven fabric comprising a card web having a fiber length of 38 of 60 mm and a nonwoven fabric comprising an air-laid web having a fiber length of 2 to 15 mm.

13. The method for producing an artificial leather substrate according to claim 11, wherein the upper-layer nonwoven fabric A further comprises a water-soluble polymer, the water-soluble polymer is composed of two types of water-soluble polymers: one having a relatively low water dissolution temperature (DL) and water redissolution temperature (RL) and the other having a relatively high water dissolution temperature (DH) and water redissolution temperature (RH), the hydroentanglement is performed at a temperature not higher than the DL, and washing with hot water at a temperature not lower than the RH is performed after the impregnation with the elastic polymer solution.

14. The method for producing an artificial leather substrate according to claim 11, wherein an inner layer C is further disposed between the upper-layer nonwoven fabric A and the base nonwoven fabric B, and the inner layer C is a wet-laid nonwoven fabric comprising a group of fibers having a fineness less fine than that of the upper-layer nonwoven fabric A, a fiber length of 3 to 15 mm and a weight per unit are of 30 to 150 g/m² and being filled to a density higher than that in the upper-layer nonwoven fabric A.

15. The method for producing an artificial leather substrate according to claim 11, wherein at least one of the groups of fibers in the upper-layer nonwoven fabric A and the base nonwoven fabric B comprises 70 parts or more of primary fibers having a relatively high softening point SH and 5 parts or more of secondary fibers having a relatively low softening point SL, and drying after the wet-laid process is performed at a temperature between the SL and the SH.

16. The method for producing an artificial leather substrate according to claim 11, wherein a reinforcement layer D is further disposed between the upper-layer nonwoven A and the base nonwoven fabric B, or disposed more inside than the base nonwoven fabric B, and the reinforcement layer D has a fineness less fine than that of the upper-layer nonwoven fabric A, a weight per unit area of 30 to 200 g/m², a density of 0.25 to 0.35 g/cm³ and an air permeability of 3 to 250 cm³/cm²·sec according to JIS L 1096 Method A.

17. The method for producing an artificial leather substrate according to claim 11, wherein the reinforcement layer D has an average of longitudinal bending resistance and lateral bending resistance (measured as having a thickness of 1 mm) according to JIS L 1096-8.19 Method A of 30 mm or more, and an elastic recovery rate at a force of 10 N measured according to JIS L 1059-1 (Monsanto method) of 50% or more.

18. The method for producing an artificial leather substrate according to claim 11, wherein prior to the hydroentanglement, the layered material is immersed in a warm bath having a temperature about the same as the water temperature of the hydroentanglement or higher.

19. A method for producing artificial leather comprising the step of napping the surface of the upper-layer nonwoven fabric A in the artificial leather substrate produced according to claim 11.

20. A method for producing artificial leather comprising the step of attaching a sheet containing polyurethane as a main component to the upper-layer nonwoven fabric A in the artificial leather substrate produced according to claim 11.

* * * * *